No. 668,988. Patented Feb. 26, 1901.
W. A. HALLENBECK.
BUTTER CUTTER.
(Application filed May 16, 1900.)
(No Model.)
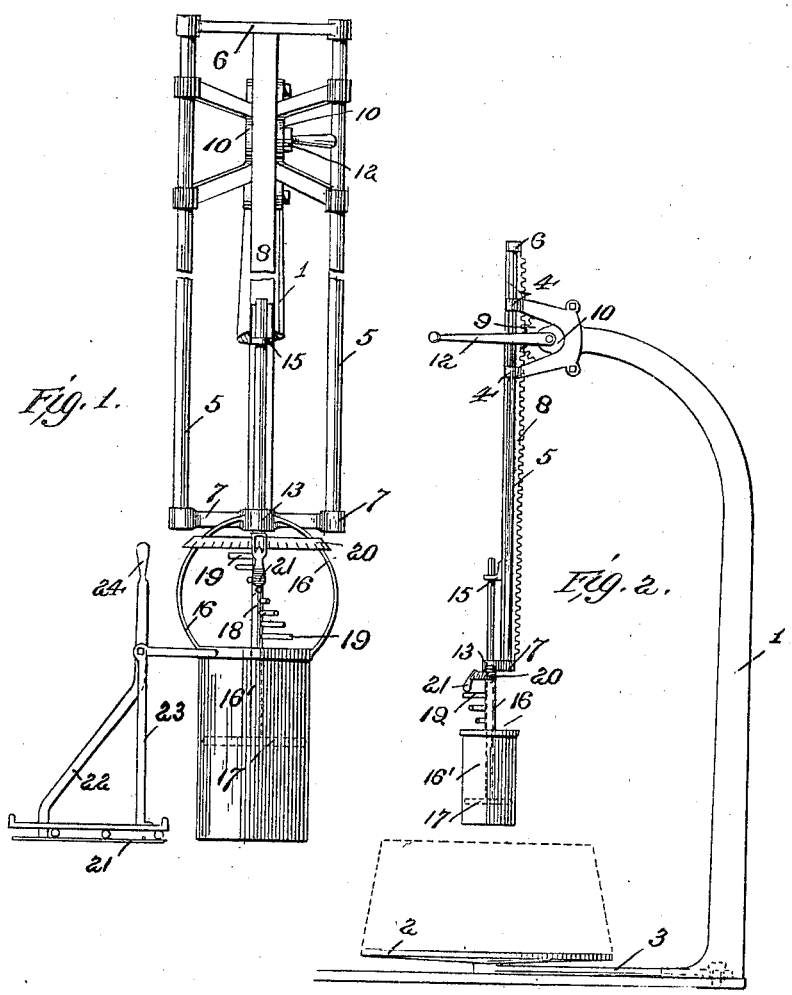

United States Patent Office.

WILLIAM AUSTIN HALLENBECK, OF BINGHAMTON, NEW YORK.

BUTTER-CUTTER.

SPECIFICATION forming part of Letters Patent No. 668,988, dated February 26, 1901.

Application filed May 16, 1900. Serial No. 16,910. (No model.)

*To all whom it may concern:*

Be it known that I, WILLIAM AUSTIN HALLENBECK, a citizen of the United States, residing at Binghamton, in the county of Broome and State of New York, have invented certain new and useful Improvements in Butter-Cutters, of which the following is a specification, reference being had therein to the accompanying drawings.

My invention is an apparatus for cutting and removing from a mass or large quantity of butter dumped from a firkin or tub measured quantities of the same.

To this end the invention includes a standard carrying a support for the butter and a cutting and measuring device movable in relation to the support.

The invention is illustrated in the accompanying drawings, in which—

Figure 1 is a side elevation of the apparatus, and Fig. 2 a detail view.

The standard 1 is secured to a suitable base, which may be so placed relatively to a refrigerator that the support 2, upon which the butter is dumped from the firkin carried on the end of an arm 3, pivoted to the base, may be swung within the refrigerator. The upper end of the standard is curved over and provided with a forked bracket, the ends thereof being provided with guiding-sleeves 4, through which the vertical rods 5 pass. The upper and the lower ends of these rods are connected by horizontal brackets 6 7, between the central portions of which a rack-bar 8 extends. A toothed quadrant 9, journaled between brackets 10, carried at the upper end of the standard 1, meshes with the teeth of this bar. On the axle of this quadrant an operating-handle 12 is secured, which is provided to turn the quadrant in raising and lowering the toothed bar. The lower bracket 7 is provided with a lateral lug 13, through which a guiding-opening passes. A second lug 15, having a corresponding guiding-opening, is secured to the rear of the toothed bar a short distance above the bracket 7, said openings being in alinement. Depending arms 16 from the bracket 7 support a cylinder 16', having a coöperating plunger 17, carried by a stem 18, guided in the openings 14 14'.

Extending radially from the stem are a series of stops 19, placed a predetermined distance apart and arranged out of vertical alinement with each other. These stops are arranged in a predetermined relation to the graduations indicated upon an arc-shaped scale 20, secured at its end to the arms 16, over which an indicator stop or handle 21 is guided, which coacts with said stops. The relative arrangement of the stops 19, handle 21, and graduations, which indicate pounds or fractions thereof, is such that when the indicator stop or handle 21 is at the one-half-pound mark it will be in alinement with the uppermost stop 19 on the stem, so that when said uppermost stop 19 contacts with the stop 21 the space between the bottom of the plunger and the cylinder will be of a size sufficient to hold just one-half pound of butter.

By moving the indicator stop or handle toward the right it will, as it registers with each successive graduation, also come in vertical alinement successively with the stops on the stem from the highest to the lowest.

In measuring off a determinate quantity of butter the indicator stop or handle is moved to the graduation indicating the same. The handle 12 is then operated to depress the rack-bar, and thereby press the cylinder into the butter in the tub until arrested by the plunger coming in contact with the butter, the plunger being arrested at the proper place in the cylinder by the stop 19 in alinement with the indicator stop or handle 21 coming in contact with the same. After the cylinder has entered the butter the required distance the butter within the same is severed or cut off from the large mass by a horizontally-arranged knife 21, carried by an arm 22, pivoted to a bracket 23, the latter being rigidly attached to the cylinder and guiding said knife. The arm 22 is controlled by a handle 24.

I claim—

1. In combination, a standard, a pivoted arm carried thereby, a support carried on the end of said arm, and measuring and cutting means carried by the standard, substantially as described.

2. In combination, a standard, a support, a cylinder, means carrying the same, a plunger coacting with said cylinder, a plunger-stem, a scale, an indicator-stop, and a series of stops on said plunger-stem arranged in a predetermined relation to the graduations on said scale and out of alinement with each other, adapted to coact with the indicator-stop, substantially as described.

3. In combination, the standard, the support, the vertically-movable rack-bar with means for operating the same, a cylinder carried thereby, a plunger having a stem coacting with the cylinder, a scale movable with the cylinder, an indicator-stop movable over said scale, and a series of radially-arranged stops on said stem out of alinement with each other coacting with said indicator-stop, substantially as described.

4. In combination, a standard, a support, a measuring-cylinder vertically movable, a bracket carried by said cylinder, a knife guided in said bracket adapted to move across the bottom of the cylinder, and an operating arm and handle pivoted to the bracket, substantially as described.

In testimony whereof I affix my signature in presence of two witnesses.

WILLIAM AUSTIN HALLENBECK.

Witnesses:
  GEORGE M. STOW,
  ALFRED A. LORD.